US008556301B2

(12) United States Patent
Thomas

(10) Patent No.: US 8,556,301 B2
(45) Date of Patent: Oct. 15, 2013

(54) TELESCOPING CONTAINMENT CLEANOUT DEVICE

(76) Inventor: Wade Alan Thomas, Las Vegas, NV (US)

( * ) Notice: Subject to any disclaimer, the term of this patent is extended or adjusted under 35 U.S.C. 154(b) by 257 days.

(21) Appl. No.: 13/022,691

(22) Filed: Feb. 8, 2011

(65) Prior Publication Data

US 2012/0198638 A1 Aug. 9, 2012

(51) Int. Cl.
*F16L 39/04* (2006.01)

(52) U.S. Cl.
USPC .......... 285/302; 285/56; 285/101; 285/145.1; 285/901; 137/362

(58) Field of Classification Search
USPC ........ 285/101, 121.1, 121.2, 145.1, 302, 315, 285/375, 901, 56–58; 137/356, 362
See application file for complete search history.

(56) References Cited

U.S. PATENT DOCUMENTS 1,278,894 A * 9/1918 Falk .............................. 285/304
2,331,373 A * 10/1943 Campbell ..................... 285/119
2,613,060 A * 10/1952 Trahan ............................ 464/18
2,617,933 A * 11/1952 Noel ............................... 52/121
3,682,500 A * 8/1972 Hamrick ........................... 285/7
4,195,538 A * 4/1980 Brown ............................ 82/141
4,242,056 A * 12/1980 Dyhr et al. .................... 417/363
4,258,792 A * 3/1981 Restarick ...................... 166/378

* cited by examiner

*Primary Examiner* — Aaron Dunwoody
*Assistant Examiner* — Fannie Kee
(74) *Attorney, Agent, or Firm* — The Law Office of Jerry D. Haynes

(57) ABSTRACT

A telescoping containment cleanout device for attachment to a cleanout pipe comprising: an inner riser portion and an outer housing, where the inner riser portion and outer housing create a channel; a telescoping portion, where the telescoping portion extends vertically through the channel; a cap at the top of the device, where the cap includes a removable sealing portion for access and cleaning of the sewer line; and stops within the channel and along the telescoping portion, where the stops provide a means to lock the telescoping portion in a vertically elevated position. The telescoping containment cleanout device may further include a plurality of o-rings within the channel, where the o-rings assist in guiding the telescoping portion through the channel. The telescoping containment cleanout device may further include a twisting sealing portion that seals the telescoping portion in a closed position.

4 Claims, 5 Drawing Sheets

TELESCOPING CONTAINMENT CLEANOUT DEVICE

BACKGROUND OF THE INVENTION

1. Field of Invention

The present invention relates to a telescoping containment cleanout device used in a riser pipe to prevent overspill during cleanout.

2. Description of Related Art

Many plumbers must clean out a plugged sewer or grease line via a cleanout pipe. Cleanouts are generally located in public areas such as lobbies, waiting rooms or restaurants, and may be in a carpeted area. Plumbers need access to the cleanout to unplug the clogged sewer or grease line. The problem with using a conventional floor cleanout is the overflow or flood that rises within the cleanout when the cap is removed. This overflow that flows from the conventional floor cleanout usually causes damage to the surrounding area near the cleanout and may actually pose health hazards that can cause a business owner to lose business over a period of time until the entire area is cleaned and all the debris and damage has been repaired. When the flooding occurs due to the removal of the cleanout cap, a business owner may suffer business interruptions and additional costs due to the required cleanup of the area near the cleanout caused by the overflow of the sewage. This problem involving cleanout cap removal is common in all commercial buildings and in some residences. Consequently, it would be advantageous to have a device that replaces the conventional cleanout and can extend above the floor level to prevent the overflow of sewage and excess water from spilling through the riser.

SUMMARY OF THE INVENTION

The present invention relates to a telescoping containment cleanout device that replaces the conventional cleanout comprising: an inner riser portion and an outer housing, where the inner riser portion and outer housing create a channel; a telescoping portion, where the telescoping portion extends vertically through the channel; a cap at the top of the device, where the cap includes a removable sealing portion, where the sealing portion seals the containment cleanout device in a closed position; and stops within the channel and along the telescoping portion, where the stops provide a means to lock the telescoping portion in a vertically elevated position. The telescoping containment cleanout device may further include a plurality of o-rings within the channel, where the o-rings assist in guiding and sealing the telescoping portion through the channel. The telescoping containment cleanout device may further include a twisting sealing portion that seals the telescoping portion in a closed position.

DETAILED DESCRIPTION

The present invention relates to a telescoping containment cleanout device that will replace a conventional cleanout to prevent the overflow of debris and sewage onto the surrounding floor surface. The telescoping containment cleanout is utilized to contain any flooding that may occur while a plumber accesses and snakes out a sewer line that is plugged.

Figure 1:
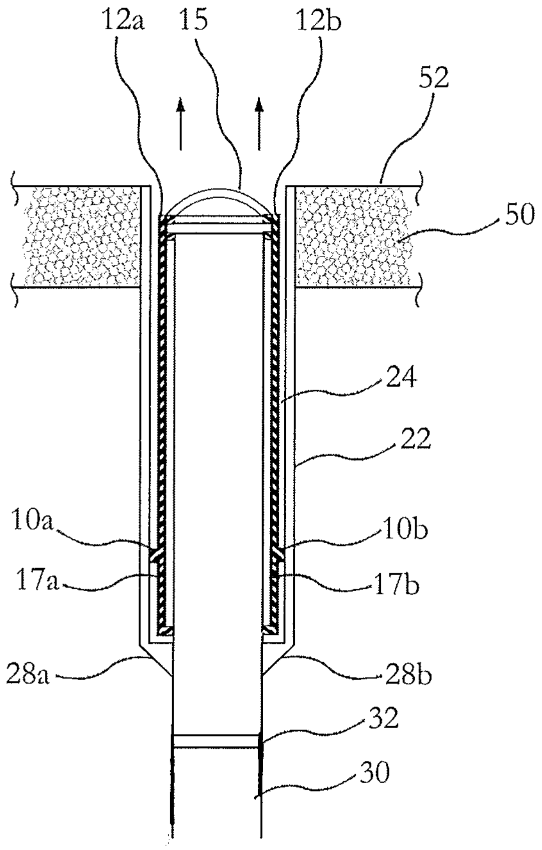
FIG. 1 depicts sectional view of a telescoping containment cleanout device according to the present invention.

FIG. 1 depicts a sectional view of the telescoping containment cleanout device according to the present invention. As depicted, the containment cleanout device is attached to an existing sewer line 30 that extends upwardly from a sewer main, not shown. The containment cleanout device is attached by using a connection band 32 onto the existing sewer line 30. The containment cleanout device extends upwardly from the existing sewer line and terminates at a floor surface 52. In a closed position, the containment cleanout device is contained within the cleanout opening. A typical, cleanout extends through a concrete floor 50 as shown and terminates at the finished floor surface 52 as depicted in FIG. 1.

The containment cleanout device includes an inner riser 24 and an outer housing 22. Riser stops 10*a* and 10*b* are positioned within the inner riser 24 and outer housing 22 to provide a means to stop the riser once it is extended upwardly from the cleanout. Arrows are depicted at the top of the containment cleanout device which indicate the direction of the containment cleanout device when it is released from the cleanout. A cleanout cap 15 is provided at the top of the containment cleanout device where the cap 15 is removed once the cleanout device is extended to allow access to the clean the sewer line. Stops 12*a* and 12*b* are provided within the containment cleanout device and will be shown in more detail in FIG. 3. Further O-rings 17*a*, 17*b* are provided at the bottom portion of the containment cleanout device that help seal and guide the riser through the inner riser 24 and outer housing 22.

Figure 2:
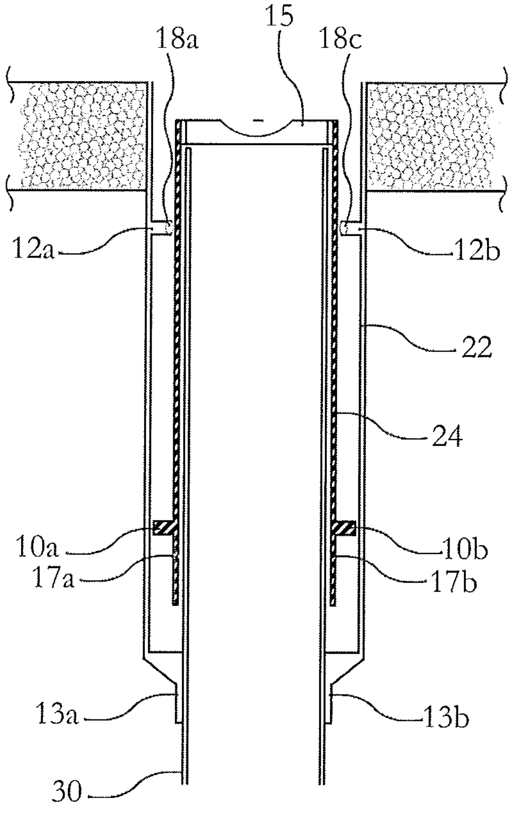
FIG. 2 depicts a more detailed view of the telescoping containment cleanout device according to the present invention.
Figure 3:
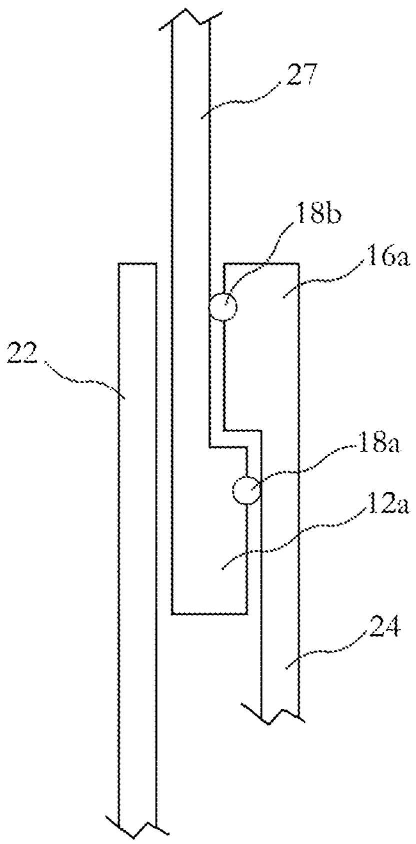
FIG. 3 depicts a more detailed view of the top riser stop and O-ring arrangement of the telescoping containment cleanout device according to the present invention.
Figure 4:
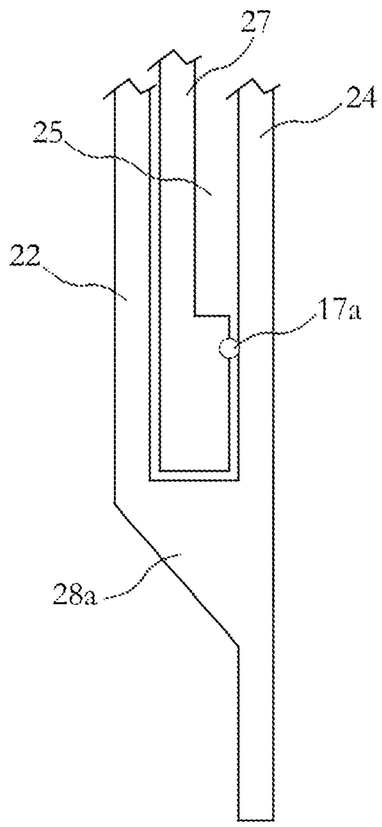
FIG. 4 depicts a detailed view of the bottom stop of the telescoping containment cleanout device according to the present invention.

FIG. 2 depicts a cross section of the containment cleanout device according to the present invention that shows a more detailed view of the riser stops 12*a*, 12*b* and bottom riser stops 10*a*, 10*b*. As shown, the outer housing 22 and inner riser portion 24 create a channel 25 (see FIG.4) for the movement of a telescoping portion through the containment cleanout device. The containment cleanout device will connect to the existing sewer line 30 at a lower straight edge 13*a*, 13*b*. Top O-rings 18*a*, 18*c* are shown on each side of the containment cleanout device and will be shown in more details in FIGS. 3 and 4. A telescoping riser portion 27 extends vertically out of the cleanout and allows for the containment of sewage or other waste into the lower section of the telescoping portion 27 and therefore prevents the overflow of the sewage onto the floor surface 52. FIG. 3 depicts a detailed view of the telescoping portion 27 as it extends upwardly to the top inner stop 16*a*, which abuts to the stop 12*a* on the telescoping portion 27. O-rings 18*a*, 8*b* provide a means to guide and seal the riser portion 27 that extends between the outer housing 22 and inner riser 24. FIG. 4 depicts the telescoping portion 27 when it is enclosed within the containment cleanout device and at the lower portion of the containment cleanout device. An O-ring 17*a* at the bottom provides the means for guiding and sealing the telescoping portion 27 into the channel 25 between the outer housing 22 and inner riser 24. A chamfered edge 28*a*, 28*b* may be provided at the bottom portion of the containment cleanout device.

Figure 5:
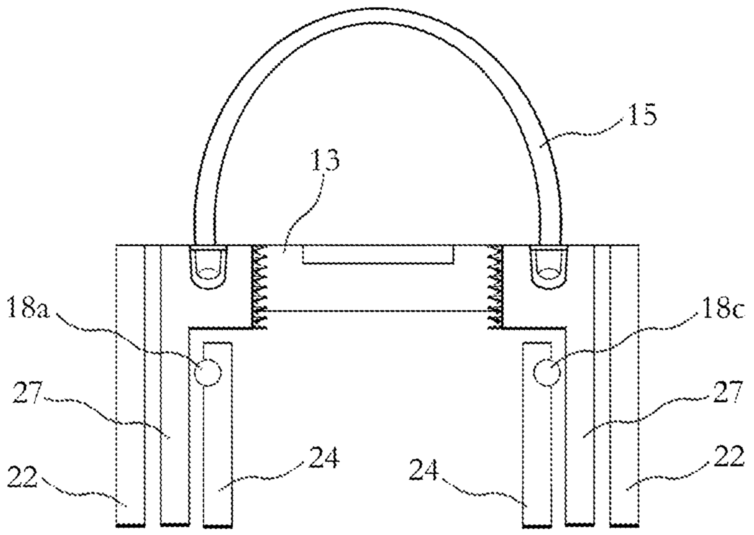
FIG. 5 depicts a detailed view of the cap for the telescoping containment cleanout device according to the present invention.

FIG. 5 provides details of the top cleanout cap 15 and includes a twisting sealing portion 13 with a handle that extends from the cap 15. The twisting portion 13 is turned to access the sewer line for cleaning. The outer housing 22 is also shown with the telescoping portion 27 in a non-extended position.

The telescoping containment cleanout device according to the present invention enables plumbers to clean sewer lines and to prevent sewage spills and property damage. The telescoping containment cleanout device connects to the existing clean out riser pipe and then extends vertically up to 18 inches above the floor surface. Once it is extended the riser containment cleanout device locks into place and contains the sewage at floor level allowing for the removal of the clean out cap and cleaning of the line without flooding at the clean out access point due to its extension above the floor plane. This helps to equalize internal pressure to the sewer line and then prevents spillage onto the floor surface surrounding the cleanout pipe. The stops and O-rings that are provided within the riser compartments allow the riser to be locked in an elevated position and therefore prevent the spillage of excess sewage from the cleanout pipe. The containment cleanout device is available or may vary in diameter to accommodate cleanout pipes ranging from 3 inches in diameter to 12 inches in diameter. The instant invention has been shown and described in what it considers to be the most practical and preferred embodiments. It is recognized, however, that departures may be made there from within the scope of the invention and that obvious modifications will occur to a person skilled in the art.

What is claimed is:

1. A telescoping containment device for attachment to a cleanout pipe comprising:

a. an inner riser portion and an outer housing, where the inner riser portion and outer housing create a channel;

b. a telescoping portion, where the telescoping portion includes a retracted position below a floor surface and an extended position above the floor surface as the telescoping portion extends vertically through the channel;

c. a cap at a top of the device just below the floor surface when the telescoping portion is in the retracted position, where the cap includes a removable sealing portion, where the sealing portion seals the containment device, said cap further including a means to maneuver the telescoping portion between the retracted position and the extended position;

d. a lower straight edge that abuts the cleanout pipe after the device is connected to the cleanout pipe; and e. stops within the channel and along the telescoping portion, where the stops provide a means to lock the telescoping portion in a vertically elevated position.

2. The telescoping containment device according to claim 1 further including a plurality of o-rings within the channel, where the o-rings assist in guiding the telescoping portion through the channel.

3. The telescoping containment device according to claim 1, further including a twisting sealing portion.

4. The telescoping containment device according to claim 1, where the stops include riser stops and bottom stops, where the riser stops lock the telescoping portion in the extended position and the bottom stops lock the telescoping portion in the retracted position.

* * * * *